(12) United States Patent
Wu et al.

(10) Patent No.: US 7,976,935 B2
(45) Date of Patent: *Jul. 12, 2011

(54) CARBON NANOTUBE CONTAINING INTERMEDIATE TRANSFER MEMBERS

(75) Inventors: Jin Wu, Pittsford, NY (US); Yuhua Tong, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/550,594

(22) Filed: Aug. 31, 2009

(65) Prior Publication Data

US 2011/0052841 A1 Mar. 3, 2011

(51) Int. Cl.
*B41M 5/50* (2006.01)

(52) U.S. Cl. ............... 428/195.1; 428/32.12; 428/32.51; 428/473.5

(58) Field of Classification Search .................. None
See application file for complete search history.

(56) References Cited

U.S. PATENT DOCUMENTS

| | | | |
|---|---|---|---|
| 5,487,707 A | 1/1996 | Sharf et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,081,429 B2 * | 7/2006 | Kishi et al. | 502/182 |
| 7,130,569 B2 | 10/2006 | Goodman et al. | |
| 7,139,519 B2 | 11/2006 | Darcy, III et al. | |
| 7,217,374 B2 * | 5/2007 | Watanabe et al. | 252/502 |
| 7,452,828 B2 * | 11/2008 | Hirakata et al. | 438/780 |
| 2006/0054866 A1 | 3/2006 | Ait-Haddou et al. | |
| 2008/0038566 A1 | 2/2008 | Cody et al. | |
| 2008/0152895 A1 | 6/2008 | Law | |
| 2009/0162637 A1 | 6/2009 | Grabowski et al. | |

FOREIGN PATENT DOCUMENTS

WO    WO 2005/100466 A1    10/2005

OTHER PUBLICATIONS

Jin Wu et al., U.S. Application No. entitled Carbon Black Polymeric Intermediate Transfer Members, filed concurrently herewith.
Jin Wu, U.S. Appl. No. 12/413,645 entitled Layered Intermediate Transfer Members, filed Mar. 30, 2009.
Jin Wu, U.S. Appl. No. 12/413,633 entitled Fluorinated Sulfonic Acid Polymer Grafted Polyaniline Containing Intermediate Transfer Members, filed Mar. 30, 2009.
Jin Wu, U.S. Appl. No. 12/413,638 entitled Perfluoropolyether Polymer Grafted Polyaniline Containing Intermediate Transfer Members, filed Mar. 30, 2009.
Jin Wu, U.S. Appl. No. 12/413,642 entitled Fluorotelomer Grafted Polyaniline Containing Intermediate Transfer Members, filed Mar. 30, 2009.
Jin Wu, U.S. Appl. No. 12/413,651 entitled Polyimide Polysiloxane Intermediate Transfer Members, filed Mar. 30, 2009.
Jin Wu, U.S. Appl. No. 12/200,074 entitled Hydrophobic Carbon Black Intermediate Transfer Components, filed Aug. 28, 2008.
Jin Wu, U.S. Appl. No. 12/129,995 on Polyimide Intermediate Transfer Components, filed May 30, 2008.
Jian Chen et al., Noncovalent Engineering of Carbon Nanotube Surfaces by Rigid, Functional Conjugated Polymers, Journal of the American Chemical Society, 2002, 124, 9034-9035.
Dec. 2, 2010 European Search Report issued in EP 10 17 3876.

* cited by examiner

*Primary Examiner* — Bruce H Hess
(74) *Attorney, Agent, or Firm* — Oliff & Berridge, PLC

(57) ABSTRACT

A UV curable intermediate transfer media, such as a belt, that includes a first supporting substrate, such as a polyimide substrate layer, and a second surface layer of a carbon nanotube.

32 Claims, No Drawings

CARBON NANOTUBE CONTAINING INTERMEDIATE TRANSFER MEMBERS

CROSS REFERENCE TO RELATED APPLICATIONS

Copending U.S. application Ser. No. 12/550,589 filed concurrently herewith, on Carbon Black Polymeric Intermediate Transfer Members, illustrates an intermediate transfer member comprised of a mixture of carbon black, a first copolymer comprised of a polyester, a polycarbonate and a polyalkylene glycol, and a second copolymer.

Copending U.S. application Ser. No. 12/413,645, filed Mar. 30, 2009, the disclosure of which is totally incorporated herein by reference, illustrates an intermediate transfer member comprised of a polyimide substrate, and thereover a polyetherimide/polysiloxane.

Copending U.S. application Ser. No. 12/413,633 filed Mar. 30, 2009, entitled Fluorinated Sulfonic Acid Polymer Grafted Polyaniline Containing Intermediate Transfer Members, the disclosure of which is totally incorporated herein by reference, illustrates an intermediate transfer member comprised of a substrate, and in contact therewith a polyaniline having grafted thereto a fluorinated sulfonic acid polymer.

Copending U.S. application Ser. No. 12/413,638, filed Mar. 30, 2009, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

Copending U.S. application Ser. No. 12/413,642, filed Mar. 30, 2009, entitled Fluorotelomer Grafted Polyaniline Containing Intermediate Transfer Members, the disclosure of which is totally incorporated herein by reference, illustrates an intermediate transfer member comprised of a substrate, and a layer comprised of polyaniline having grafted thereto a fluorotelomer.

Copending U.S. application Ser. No. 12/413,651, filed Mar. 30, 2009, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

Illustrated in U.S. application Ser. No. 12/200,074 entitled Hydrophobic Carbon Black Intermediate Transfer Components, filed Aug. 28, 2008, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/129,995, filed May 30, 2008, the disclosure of which is totally incorporated herein by reference, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of for example, from about 175° C. to about 290° C. over a period of time of from about 10 to about 120 minutes.

BACKGROUND

Disclosed are intermediate transfer members, and more specifically, intermediate transfer members useful in transferring images such as a developed image in an electrostatographic, for example xerographic, including digital, image on image, and the like, machines or apparatuses and printers. In embodiments, there are selected intermediate transfer members comprised of a supporting substrate such as a polyimide first layer, and a UV (ultraviolet light) curable or UV cured second layer comprised of carbon nanotubes, wherein the polyimide substrate layer further includes a conductive component, and wherein the second layer includes an optional epoxy acrylate polymer, a photoinitiator, and an optional acrylate monomer or a vinyl monomer; a fatty acid epoxy acrylate and/or a fluorinated acrylate oligomer.

A number of advantages are associated with the intermediate transfer members of the present disclosure in embodiments thereof, such as excellent mechanical characteristics, robustness, consistent, and excellent surface resistivities, excellent image transfer (toner transfer and cleaning), as compared to a number of known intermediate transfer members with a polyimide base layer; acceptable adhesion properties, when there is included in the plural layered intermediate transfer member an adhesive layer; excellent maintained conductivity or resistivity for extended time periods; dimensional stability; ITB (intermediate transfer belt) humidity insensitivity for extended time periods; excellent dispersability in a polymeric solution; low and acceptable surface friction characteristics; and minimum or substantially no peeling or separation of the layers.

More specifically, as UV curing technology matures, it offers at least two advantages; almost zero VOC volatiles; and preparation efficiencies (cured within seconds).

Also, as compared to intermediate transfer members that include a number of conductive components, such as carbon black, the dispersed carbon nanotube intermediate transfer members of the present disclosure are almost transparent due primarily to the excellent conductivity of the carbon nanotubes; and, in embodiments, a small amount, such as 1 weight percent or less, of the carbon nanotubes can be selected to achieve a surface resistivity of, for example, from about $10^8$ to about $10^{13}$ ohm/sq for the intermediate transfer members disclosed herein.

Accordingly, in embodiments of the present disclosure, the carbon nanotube containing intermediate transfer members are almost completely transparent when, for example, selected in amounts of about 1 weight percent which allows the UV light to penetrate across the carbon nanotube layer for a complete, almost 100 percent, cure. In comparison, carbon black containing intermediate transfer members usually requires a high loading of about 5 weight percent to achieve a comparable resistivity (with less than 5 weight percent, the ITB resistivity is out of the functional range, for example, over $10^{14}$ ohm/sq). Also, the carbon black containing layer substantially prevents UV light from penetrating deep into the layer, thus complete cure is difficult to obtain.

In aspects thereof, the present disclosure relates to a multi layer intermediate transfer member, such as a belt (ITB) comprised of a carbon nanotube surface layer and polyimide base layer, where the polyimide layer further includes as an optional additive a conductive component, an optional adhesive layer situated between the two layers, and which layered member can be prepared by known solution casting methods and known extrusion molded processes with the optional adhesive layer being generated, and applied by known spray coating and flow coating processes.

In a typical electrostatographic reproducing apparatus, such as xerographic copiers, printers, multifunctional machines, a light image of an original to be copied is recorded in the form of an electrostatic latent image upon a photosensitive member or a photoconductor, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently, transfer with a high transfer efficiency the developed image from the intermediate transfer member to a permanent substrate. The toner image is subsequently usually fixed or fused upon a support, which may be the photosensitive member itself, or other support sheet such as plain paper.

Intermediate transfer members possess a number of advantages, such as enabling high throughput at modest process speeds; improving registration of the final color toner image in color systems using synchronous development of one or more component colors, and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member, which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties, and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member with a number of the advantages illustrated herein, such as excellent mechanical, and humidity insensitivity characteristics, permitting high copy quality where developed images with minimal resolution issues can be obtained. It is also desired to provide a weldable intermediate transfer belt that may not, but could have puzzle cut seams, and instead has a weldable seam, thereby providing a belt that can be manufactured without labor intensive steps, such as manually piecing together the puzzle cut seam with fingers, and without the lengthy high temperature and high humidity conditioning steps.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

EMBODIMENTS

In aspects thereof there is disclosed an intermediate transfer member comprised of a supporting substrate, and a coating thereover comprised of a carbon nanotube layer; an intermediate transfer member comprised of a polyimide supporting substrate layer, and thereover a layer comprised of a photoinitiator, a polymer or a monomer, and a carbon nanotube, and wherein the carbon nanotube containing layer has been subjected to exfoliation and debundling, and where this layer is UV curable; an intermediate transfer member comprised of a polyimide supporting substrate layer, and thereover a carbon nanotube surface layer, the carbon nanotube being comprised of fullerenes, and wherein the carbon nanotube has been subjected to exfoliation and debundling by the mixing of the carbon nanotube with a dispersant, and wherein the surface layer includes an epoxy acrylate polymer, an acrylate monomer, and a photoinitiator as represented by

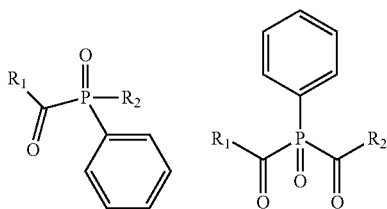

wherein R is alkyl, aryl, or mixtures thereof, and wherein the dispersant is represented by

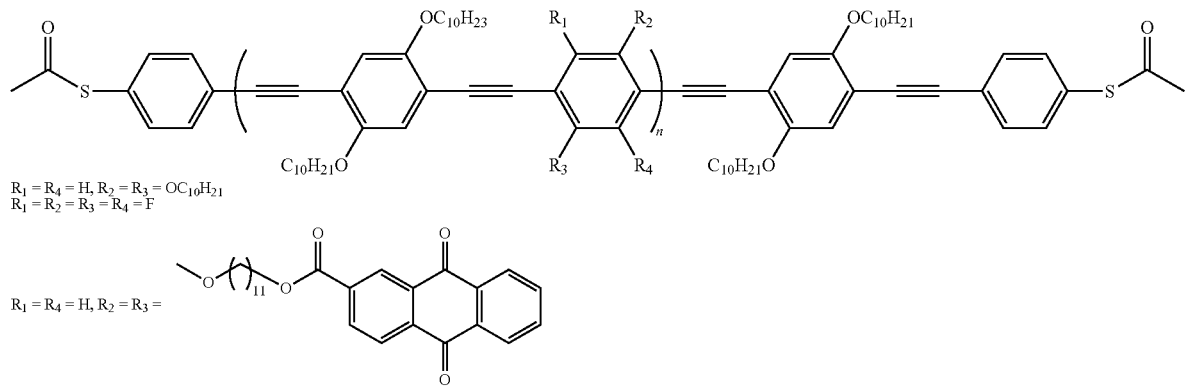

R₁ = R₄ = H, R₂ = R₃ = OC₁₀H₂₁
R₁ = R₂ = R₃ = R₄ = F

R₁ = R₄ = H, R₂ = R₃ = wherein n represents the number of repeating segments, and

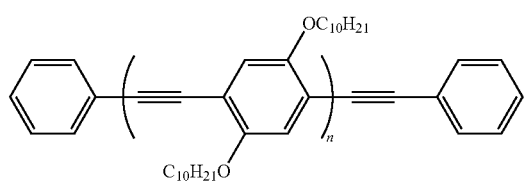

wherein n represents the number of repeating segments, and F is a halide, such as a chloride, fluoride, bromide, or iodide; examples of n being from 1 to about 225, from about 5 to about 100; from about 50 to about 125, from about 10 to about 75, and the like; a transfer media comprised of a polyimide first supporting substrate layer, and thereover a second layer comprised of a treated carbon nanotube as illustrated herein, an adhesive layer situated between the first layer and the second layer, and wherein the first layer further contains a known conductive component like carbon black, a polyaniline, and the like; an intermediate transfer belt comprised of a polyimide substrate layer, and thereover a layer comprised of a treated nanotube which is exfoliated and debundled carbon nanotube, and wherein the substrate layer further includes a conductive component; wherein the substrate is of a thickness of from about 20 to about 500 microns, and the exfoliated and debundled carbon nanotube layer is of a thickness of from about 1 to about 150 microns, wherein the weight percent of the carbon nanotube is from about 0.1 to about 10, or from about 0.5 to about 3, and wherein the total of the components in this layer is about 100 percent; an intermediate transfer member comprising, for example, a polyimide supporting substrate, and thereover an exfoliated and debundled carbon nanotube layer that further includes a polymer selected from the group consisting of a polyimide, a polycarbonate, a polyamideimide, a polyphenylene sulfide, a polyamide, a polysulfone, a polyetherimide, a polyester, a polyvinylidene fluoride, a polyethylene-co-polytetrafluoroethylene, and mixtures thereof present in an amount of from about 1 to about 80 weight percent.

Alkyl for the dispersant contains, for example, from about 1 to about 25, from 1 to about 18, from 1 to about 12, from 1 to about 6 carbon atoms; and aryl contains, for example, from 6 to about 36, from 6 to about 24, from 6 to about 18, from 6 to 12 carbon atoms. Additionally, the alkyl and aryl substituents include substituted derivatives thereof. Specific alkyls are methyl, ethyl, propyl, butyl, pentyl, hexyl, and the like, while examples of aryl are phenyl, anthryl, benzyl, and the like.

In embodiments to, for example, achieve a high conductivity, such as a surface resistivity of from about $10^6$ to about $10^{12}$ ohm/sq, especially when about 1 weight percent or less of the carbon nanotubes are present for the intermediate transfer members illustrated herein the carbon nanotubes (CNT) are exfoliated and debundled (each CNT is separated rather than aggregated with others). Zyvex Performance Materials (Columbus, Ohio) has developed a proprietary technology to exfoliate and debundle CNT, where CNT is dispersed with the aid of a dispersant, such as a dispersant, reference *Journal of The American Chemical Society*, 124, 9034, 2002, and as illustrated below

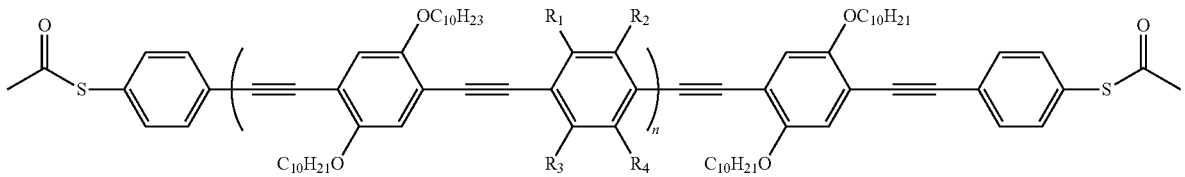

$R_1 = R_4 = H, R_2 = R_3 = OC_{10}H_{21}$
$R_1 = R_2 = R_3 = R_4 = F$ $R_1 = R_4 = H, R_2 = R_3 =$

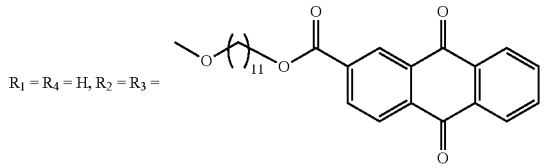

-continued

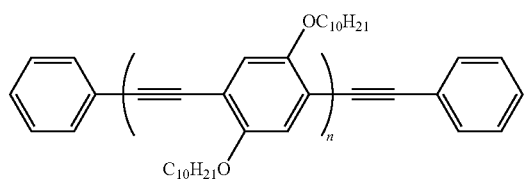

wherein n represents the number of repeating segments, and F is a halide, and more specifically, fluoride; and generally wherein it is envisioned that each R substituent may be alkyl, alkoxy, or aryl, however, it is not desired to be limited by theory.

The weight ratio of the CNT to the dispersant is, for example, from about 95/5 to about 60/40, or from about 90/10 to about 70/30, or 83.3/16.7. Specific examples of the CNT dispersion comprise a multi-walled nanotube (MWNT)/dispersant selected in a ratio of about 83.3/16.7 in methylene chloride, about 0.78 weight percent solids, available from Zyvex Performance Materials.

Carbon nanotubes (CNTs) are known and generally refer to allotropes of carbon with a cylindrical nanostructure. Nanotubes can be constructed with a length-to-diameter ratio of up to 28,000,000:1, and it has been reported that they exhibit extraordinary strength and unique electrical properties, and are efficient conductors of heat.

Nanotubes are members of the fullerene structural family, which also includes spherical shaped buckyballs. The ends of a nanotube might be capped with a hemisphere of the buckyball structure. Their name is derived from their size, since the diameter of a nanotube is, for example, on the order of a few nanometers (approximately 1/50,000th of the width of a human hair), while they can be up to several millimeters in length. Nanotubes are categorized as single-walled nanotubes (SWNTs) and multi-walled nanotubes (MWNTs).

Examples of supporting substrates include polyimides, polyamideimides, polyetherimides, and mixtures thereof.

Examples of supporting substrates are polyimides inclusive of known low temperature and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

Suitable supporting substrate polyimides include those formed from various diamines and dianhydrides, such as polyimide, polyamideimide, polyetherimide, and the like. More specifically, polyimides include aromatic polyimides such as those formed by reacting pyromellitic acid and diaminodiphenylether, or by imidization of copolymeric acids, such as biphenyltetracarboxylic acid and pyromellitic acid with two aromatic diamines, such as p phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

In embodiments, the polyamideimides can be synthesized by at least the following two methods (1) isocyanate method which involves the reaction between isocyanate and trimellitic anhydride; or (2) acid chloride method where there is reacted a diamine and trimellitic anhydride chloride. Examples of these polyamideimides include VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

The conductive material, such as a carbon black, a metal oxide or a polyaniline, is present in the substrate layer of the intermediate transfer member in, for example, an amount of from about 1 to about 30 weight percent, from about 3 to about 20 weight percent, or specifically from about 5 to about 15 weight percent.

More specifically, the carbon black selected surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM (intermediate transfer member) include VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN XC72), VULCAN® XC605, VULCAN® XC305, REGAL 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); Channel carbon blacks available from Evonik-Degussa; Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

The carbon black may exist or formed into a uniform dispersion, which dispersion is then coated on glass plates using a draw bar coating method. The resulting individual films can be dried at high temperatures, such as from about 100° C. to about 400° C., for a suitable period of time, such as from about 20 to about 180 minutes, while remaining on the separate glass plates. After drying and cooling to room temperature, about 23° C. to about 25° C., the films on the glass plates can be immersed into water overnight, about 18 to 23 hours, and subsequently, the 50 to 150 micron thick films can be released from the glass to form a functional intermediate transfer member.

Adhesive layer components usually situated between the supporting substrate, and the top carbon nanotube layer thereover are, for example, a number of resins or polymers of epoxy, urethane, silicone, polyester, and the like. Generally, the adhesive layer is a solventless layer, that is, materials that are liquid at room temperature (about 25° C.), and are able to crosslink to an elastic or rigid film to adhere at least two materials together. Specific adhesive layer components include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps) and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, as illustrated hereinafter.

The thickness of each layer of the intermediate transfer member can vary, and is usually not limited to any specific value. In specific embodiments, the substrate layer or first layer thickness is, for example, from about 20 to about 300 microns, from about 30 to about 200 microns, from about 75 to about 150 microns, and from about 50 to about 100 microns, while the thickness of the top carbon nanotube layer is, for example, from about 1 to about 150 microns, from about 10 to about 100 microns, from about 20 to about 70 microns, and from about 30 to about 50 microns. The adhesive layer thickness is, for example, from about 1 to about 100 nanometers, from about 5 to about 75 nanometers, or from about 50 to about 100 nanometers.

The carbon nanotube layer optionally includes, in embodiments, an epoxy acrylate, and a photoinitiator such as acyl phosphine; an acrylate monomer, or a vinyl monomer, or mixtures thereof.

Examples of the epoxy acrylates are aliphatic epoxy acrylates such as Laromer LR8765 (functionality of about 2 and molar mass of about 330 g/mol); aromatic epoxy acrylates such as LAROMER® LR8986 (functionality of about 2.4 and molar mass of about 510 g/mol), LR9019 (functionality of about 2.4 and molar mass of about 580 g/mol), LR9023 (functionality of about 2.4 and molar mass of about 480 g/mol), all available from BASF. The epoxy acrylates are considered to be low surface energy materials and area available from Cognis Inc. as PHOTOMER® 3082 (acrylated epoxy linseed oil), and 3072 (fatty acid modified epoxy diacrylate), available from Cognis Inc.

The epoxy acrylates, which primarily provide for the carbon nanotube layer integrity, and are UV curable, are present in an amount of, for example, from about 5 to about 80 weight percent, or from about 10 to about 40 weight percent of the UV cured carbon nanotube layer components.

The carbon nanotube layer, in embodiments, can have added thereto acrylate monomers or vinyl monomers such as LAROMER® TMPTA (trimethylolpropane triacrylate), BDDA (butanediol diacrylate), HDDA (hexanediol diacrylate), TPGDA (tripropyleneglycol diacrylate), DPGDA (dipropyleneglycol diacrylate), POEA (phenoxyethyl acrylate), LR8887 (trimethylolpropaneformal monoacrylate), TBCH (4-t-butylcyclohexyl acrylate), LA (lauryl acrylate 12/14), EDGA (ethyldiglycol acrylate), BDMA (butanediol monoacrylate), DCPA (dihydrodicyclopentadienyl acrylate), DVE-3 (triethyleneglycol divinyl ether), vinyl caprolactam, n-vinyl formamide, all available from BASF; and CN4000 (fluorinated acrylate oligomer), available from Sartomer Co., Warrington, Pa.

The acrylate monomers or vinyl monomers function, for example, as diluents to reduce the viscosity of the coating dispersion, and solvents for the photoinitiators, and crosslink with the epoxy acrylates by UV radiation to further provide for the carbon nanotube layer integrity and strength, and which monomers are present in an amount of from about 10 to about 80 weight percent, or from about 30 to about 60 weight percent of the components present in the carbon nanotube layer.

Examples of the photoinitiators selected for the carbon nanotube layer include but are not limited to acyl phosphines, α-hydroxyketones, benzyl ketals, α-aminoketones, and mixtures thereof; and which photoinitiators are selected in various suitable amounts, such as illustrated herein, and, for example, from about 0.1 to about 20, from about 1 to about 10, from about 3 to about 7, and from 1 to about 5 parts.

Examples of the acyl phosphine photoinitiators include mono acyl phosphine oxide (MAPO) such as DAROCUR® TPO; and bis acyl phosphine oxide (BAPO) such as IRGACURE® 819, both available from Ciba Specialty Chemicals. Specific examples of the acyl phosphine photoinitiators are diphenyl (2,4,6-trimethylbenzoyl)phosphine oxide (DAROCUR® TPO), diphenyl (2,4,6-trimethylbenzoyl) phosphine oxide (ESACURE® TPO, LAMBERTI Chemical Specialties, Gallarate, Italy), diphenyl(2,4,6-trimethylbenzoyl)phosphine oxide (FIRSTCURE® HMPP available from Albemarle Corporation, Baton Rouge, La.), diphenyl(2,4,6-trimethylbenzoyl)phosphine oxide (LUCIRIN® TPO, available from BASF, Ludwigshafen, Germany), diphenyl(2,4,6-trimethylbenzoyl)phosphinate (LUCIRIN® TPO-L), and phenyl bis(2,4,6-trimethyl benzoyl)phosphine oxide (IRGACURE® 819, available from Ciba Specialty Chemicals).

Examples of the α-hydroxyketone photoinitiators selected for the carbon nanotube layer include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals.

Examples of the α-aminoketones photoinitiators selected for the carbon nanotube surface layer include 2-benzyl-2-(dimethylamino)-1-[4-(4-morpholinyl)phenyl]-1-butanone (IRGACURE® 369), and 2-methyl-1-[4-(methylthio)phenyl]-2-(4-morpholinyl)-1-propanone (IRGACURE® 907), both available from Ciba Specialty Chemicals.

Examples of the benzyl ketal photoinitiators selected for the carbon nanotube surface layer include α,α-dimethoxy-α-phenylacetophenone (IRGACURE® 651), available from Ciba Specialty Chemicals.

The photoinitiators act as catalysts to initiate the polymerization upon UV radiation, and which photoinitiators are present, for example, in an amount of from about 0.5 to about 10 weight percent, or from about 3 to about 6 weight percent of the UV cured surface layer components.

The disclosed intermediate transfer members are, in embodiments, weldable, that is the seam of the member like a belt is weldable, and more specifically, may be ultrasonically welded to produce a seam. The surface resistivity of the disclosed intermediate transfer member is, for example, from about $10^8$ to about $10^{13}$ ohm/sq, or from about $10^9$ to about $10^{12}$ ohm/sq. The sheet resistivity of the intermediate transfer weldable member is, for example, from about $10^8$ to about $10^{13}$ ohm/sq, or from about $10^9$ to about $10^{12}$ ohm/sq.

The intermediate transfer members illustrated herein like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

Subsequent to the toner latent image being transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiments, the intermediate transfer member further includes an outer release layer.

Optional release layer examples situated on and in contact with the carbon nanotube top layer, and of a suitable thickness of, for example, from about 0.5 to about 20, from about 1 to about 10, from about 1 to about 5, and from about 0.01 to about 10 microns, include suitable materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture with, for example, a molecular weight $M_w$ of approximately 3,500); and fluoroelastomers such as those available as VITON® such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, and hexafluoropropylene, known commercially as VITON A®; (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable known commercially available cure site monomer.

The layer or layers may be deposited on the substrate by known coating processes. Known methods for forming the carbon nanotube on the substrate include dipping, spraying, such as by multiple spray applications of thin films, casting, flow coating, web coating, roll coating, extrusion, molding, or the like. In embodiments, the layer or layers can be deposited or generated by spraying such as by multiple spray applications of thin films, casting, by web coating, by flow coating, and more specifically, by lamination.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

Specific embodiments will now be described in detail. These examples are intended to be illustrative, and are not limited to the materials, conditions, or process parameters set forth in these embodiments. All parts are percentages by weight of total solids unless otherwise indicated.

Comparative Example 1

Preparation of a Single Polyimide Transfer Member

One gram of Color Black FW1 (B.E.T. surface area of 320 $m^2/g$, DBP absorption of 2.89 ml/g, primary particle diameter of 13 nanometers) as obtained from Evonik-Degussa, was mixed with 26.25 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate.

The single layer film on the glass obtained above was then immersed into water overnight, about 23 hours, and the freestanding film was released from the glass automatically resulting in a single layer intermediate transfer member with a 75 micron thick carbon black/polyimide layer with a ratio by weight percent of 14 of carbon black and 86 of polyimide.

Example I

Preparation of a Dual Carbon Nanotube Transfer Member

A polyimide base layer was prepared as follows. One gram of Color Black FW1 (B.E.T. surface area of 320 $m^2/g$, DBP absorption of 2.89 ml/g, primary particle diameter of 13 nanometers), as obtained from Evonik-Degussa, was mixed with 26.25 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate.

A CNT UV cured layer was prepared as follows. One hundred grams of the multi-walled nanotube (MWNT)/dispersant/methylene chloride dispersion (MWNT/dispersant of 83/17 in methylene chloride, about 0.78 weight percent solids), as obtained from Zyvex Performance Materials, was mixed with 15.6 grams of the epoxy acrylate, LAROMER® LR8765 (functionality of about 2 and molar mass of about 330 g/mol, from BASF), 57.7 grams of the acrylate monomer, LAROMER® DPGDA (dipropyleneglycol diacrylate, from BASF), and 3.9 grams of the photoinitiator, IRGACURE® 819 (phenyl bis(2,4,6-trimethyl benzoyl) phosphine oxide, obtained from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

Molar mass, in embodiments, refers, for example, to weight average molecular weight which can be determined by a number of methods such as by using a Waters GPC device.

The dual layer film on the glass was then immersed into water overnight, about 23 hours, and the freestanding film was released from the glass automatically resulting in a dual layer intermediate transfer member with a 75 micron thick carbon black/polyimide base layer with a ratio by weight percent of 14 carbon black and 86 polyimide, and a 10 micron thick MWNT UV cured surface layer coated on the base layer with a ratio by weight percent of 0.83 MWNT, 0.17 of dispersant, 20 of epoxy acrylate, 74 of DPGDA, and 5 of IRGACURE® 819.

Example II

Preparation of a Dual Carbon Nanotube Transfer Member

A dual layer transfer member was prepared by repeating the process of Example I except that the CNT UV cured surface layer was prepared as follows. Fifty grams of the multi-walled nanotube (MWNT)/dispersant/methylene chloride dispersion (MWNT/dispersant is 83/17 in methylene chloride, about 0.78 weight percent solids), as obtained from Zyvex Performance Materials, was mixed with 15.6 grams of the epoxy acrylate, LAROMER® LR8765 (functionality of about 2 and molar mass of about 330 g/mol, obtained from BASF), 57.7 grams of the acrylate monomer, LAROMER® DPGDA (dipropyleneglycol diacrylate, from BASF), and 4.3 grams of the photoinitiator, IRGACURE® 819 (phenyl bis(2,4,6-trimethyl benzoyl) phosphine oxide, from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

The dual layer film on the glass was then immersed into water overnight, about 23 hours, and the freestanding film was released from the glass automatically, that is without any assistance from a device or individual resulting in a dual layer intermediate transfer member with a 75 micron thick carbon black/polyimide base layer with a ratio by weight percent of 14 carbon black and 86 polyimide, and a 10 micron thick MWNT UV cured surface layer with a ratio by weight percent of 0.42 MWNT, 008 of the dispersant, 20 of the epoxy acrylate, 74 of DPGDA and 5.5 of IRGACURE RE® 819.

Example III

Preparation of a Dual Carbon Nanotube Transfer Member

A dual layer transfer member was prepared by repeating the process of Example I except that the CNT UV cured surface layer was prepared as follows. One hundred grams of the multi-walled nanotube (MWNT)/dispersant/methylene chloride dispersion (MWNT/dispersant is 83/17 in methylene chloride, about 0.78 weight percent solids), as obtained from Zyvex Performance Materials, was mixed with 15.6 grams of the epoxy acrylate, LAROMER® LR8765 (functionality is about 2 and molar mass is about 330 g/mol, from BASF), 57.7 grams of the acrylate monomer, LAROMER® TMPTA (trimethylolpropane triacrylate, from BASF), and 3.9 grams of the photoinitiator, IRGACURE® 651 (α,α-dimethoxy-α-phenylacetophenone, available from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

The dual layer film on the glass was then immersed into water overnight, about 23 hours, and the freestanding film was released from the glass automatically resulting in a dual layer intermediate transfer member with a 75 micron thick carbon black/polyimide base layer with a ratio by weight percent of 14 carbon black and 86 polyimide, and a 10 micron thick MWNT UV cured surface layer with a ratio by weight percent of 0.83 MWNT, 0.17 of the dispersant, 20 of the epoxy acrylate, 74 of TMPTA, and 5 of IRGACURE® 651.

Example IV

Preparation of a Dual Carbon Nanotube Transfer Member

A dual layer transfer member was prepared by repeating the process of Example I except that the CNT UV cured surface layer was prepared as follows. One hundred grams of the multi-walled nanotube (MWNT)/dispersant/methylene chloride dispersion (MWNT/dispersant is 83/17 in methylene chloride, about 0.78 weight percent solids), as obtained from Zyvex Performance Materials, was mixed with 15.6 grams of the epoxy acrylate, LAROMER® LR8765 (functionality of about 2 and molar mass of about 330 g/mol, from BASF), 49.9 grams of the acrylate monomer, LAROMER® TMPTA (trimethylolpropane triacrylate, available from BASF), 7.8 grams of the fluorinated acrylate oligomer, CN4000 from Sartomer Co., and 3.9 grams of the photoinitiator, IRGACURE 651 (α,α-dimethoxy-α-phenylacetophenone, available from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

The dual layer film on the glass was then immersed into water overnight, about 23 hours, and the freestanding film was released from the glass automatically resulting in a dual layer intermediate transfer member with a 75 micron thick carbon black/polyimide base layer with a ratio by weight percent of 14 carbon black and 86 polyimide, and a 10 micron thick MWNT UV cured surface layer with a ratio by weight percent of 0.83 MWNT, 0.17 of the dispersant, 20 of the epoxy acrylate, 64 of TMPTA, 10 of the above fluorinated acrylate oligomer, and 5 of IRGACURE® 651.

Surface Resistivity Measurement

The above ITB members or devices of Examples I, II, III and IV were measured for surface resistivity (averaging four to six measurements at varying spots, 72° F./65 percent room humidity) using a High Resistivity Meter (Hiresta-Up MCP-HT450 from Mitsubishi Chemical Corp.). The results are provided in Table 1.

TABLE 1

|  | Surface Resistivity (Ohm/sq) |
| --- | --- |
| Example I | $3.7 \times 10^9$ |
| Example II | $4.3 \times 10^{12}$ |
| Example III | $7.1 \times 10^9$ |
| Example IV | $6.2 \times 10^9$ |
| Comparative Example 1 | $2.3 \times 10^{10}$ |

Functional dual layer ITB devices were obtained comprising a polyimide base layer and a CNT UV cured surface layer. When comparing Example I and Example II, the difference was that the CNT amount at about 1 weight percent and 0.5 weight percent, respectively, of the total surface layer. The surface resistivity increased with the lower loading of the CNT, however, both were within the desired functional resistivity range for an ITB of from about $10^8$ to about $10^{13}$ ohm/sq.

When comparing Examples III and IV, the difference was to replace some of the acrylate monomer with a fluorinated acrylate oligomer in Example IV. Although the contact angles were not measured, it is believed that the Example IV ITB should possess a higher contact angle than the Example III ITB, and than the Comparative Example 1 ITB As the Example IV ITB includes a fluorinated component, the surface energy of the ITB is lower, thus the hydroponic dual layer ITB device of Example IV is expected to have improved toner transfer and permit improved ITB cleaning as contrasted to Comparative Example 1.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a supporting substrate, and a carbon nanotube layer and wherein said supporting substrate is selected from the group consisting of polyimides, polyamideimides, polyetherimides, and mixtures thereof.

2. An intermediate transfer member comprised of a supporting substrate, and a carbon nanotube layer wherein said supporting substrate is a polyimide, and said carbon nanotube is in contact with said polyimide as a surface layer thereof, and which surface layer is cured by ultraviolet light.

3. An intermediate transfer member in accordance with claim 2 wherein said carbon nanotube has been subjected to exfoliation and debundling.

4. An intermediate transfer member in accordance with claim 3 wherein said exfoliation, and said debundling is accomplished by adding to said carbon nanotube layer a dispersant as represented by at least one of

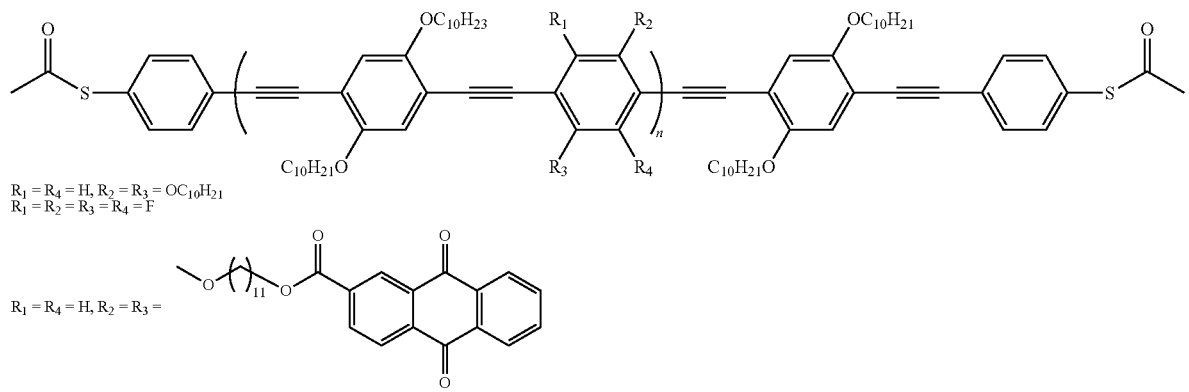

wherein n represents the number of repeating segments, and

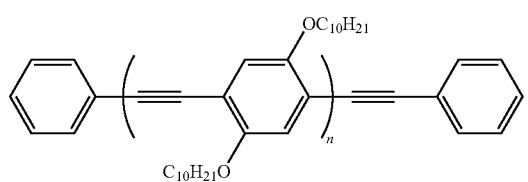

wherein n represents the number of repeating segments, and F is a halide.

5. An intermediate transfer member in accordance with claim 4 wherein the ratio of said carbon nanotube to said dispersant is from about 95/5 to about 60/40 and said $R_1$, $R_2$, $R_3$ and $R_4$ are fluoride.

6. An intermediate transfer member in accordance with claim 4 wherein the ratio of said carbon nanotube to said dispersant is from about 90/10 to about 70/30, and $R_1$, $R_2$, $R_3$ and $R_4$ are fluoride.

7. An intermediate transfer member in accordance with claim 2 wherein said carbon nanotube layer is comprised of a cylindrical shaped carbon allotrope of fullerene of at least one of a single-walled nanotube, a multi-walled nanotube, a torus nanotube, or a nanobud nanotube.

8. An intermediate transfer member in accordance with claim 2 wherein said carbon nanotube possesses a diameter of from about 1 to about 50 nanometers, and a length of from about 50 to about 10,000 microns.

9. An intermediate transfer member in accordance with claim 2 wherein said carbon nanotube is a single-walled nanotube, or a multi-walled nanotube each present in an amount of from about 0.1 to about 10 weight percent.

10. An intermediate transfer member in accordance with claim 2 wherein said carbon nanotube is a single-walled nanotube, or a multi-walled nanotube each present in an amount of from about 0.5 to about 3 weight percent.

11. An intermediate transfer member in accordance with claim 2 further including in said carbon nanotube layer a polymer selected from the group consisting of a polyimide, a polycarbonate, a polyamideimide, a polyphenylene sulfide, a polyamide, a polysulfone, a polyetherimide, a polyester, a polyvinylidene fluoride, a polyethylene-co-polytetrafluoroethylene, and mixtures thereof, each present in an amount of from about 1 to about 80 weight percent of the total nanotube layer components.

12. An intermediate transfer member in accordance with claim 2 further including in said carbon nanotube layer at least one of an epoxy acrylate, a photoinitiator, an optional acrylate monomer, and an optional vinyl monomer.

13. An intermediate transfer member in accordance with claim 12 wherein said epoxy acrylate is one of an aliphatic epoxy acrylate, an aromatic epoxy acrylate, an acrylated epoxy linseed oil, or a fatty acid modified epoxy diacrylate, and mixtures thereof, each present in an amount of from about 5 to about 80 weight percent of the carbon nanotube layer components.

14. An intermediate transfer member in accordance with claim 12 wherein said epoxy acrylate possesses a molar mass of from about 200 to 1,500, and is present in an amount of from about 10 to about 40 weight percent of the total carbon nanotube layer components.

15. An intermediate transfer member in accordance with claim 12 wherein said photoinitiator is one of an acyl phosphine, an α-hydroxyketone, a benzyl ketal, an α-aminoketone, and mixtures thereof, each present in an amount of from about 0.5 to about 10 weight percent of the total carbon nanotube layer components.

16. An intermediate transfer member in accordance with claim 12 wherein said photoinitiator is selected from the group consisting of diphenyl (2,4,6-trimethylbenzoyl) phosphine oxide, diphenyl(2,4,6-trimethylbenzoyl)phosphinate, phenyl bis(2,4,6-trimethyl benzoyl)phosphine oxide, 1-hydroxy-cyclohexylphenyl ketone, 2-hydroxy-2-methyl-1-phenyl-1-propanone, 2-hydroxy-1-[4-(2-hydroxyethoxy)phenyl]-2-methyl-1-propanone, 2-benzyl-2-(dimethylamino)-1-

[4-(4-morpholinyl)phenyl]-1-butanone, 2-methyl-1-[4-(methylthio)phenyl]-2-(4-morpholinyl)-1-propanone, and α,α-dimethoxy-α-phenylacetophenone, each present in an amount of from about 2 to about 7 weight percent of the total carbon nanotube layer components.

17. An intermediate transfer member in accordance with claim 12 wherein said acrylate monomer is present, and is at least one of trimethylolpropane triacrylate, butandiol diacrylate, hexandiol diacrylate, tripropyleneglycol diacrylate, dipropyleneglycol diacrylate, phenoxyethyl acrylate, trimethylolpropaneformal monoacrylate, 4-t-butylcyclohexyl acrylate, lauryl acrylate, ethyldiglycol acrylate, butandiol monoacrylate, dihydrodicyclopentadienyl acrylate, or fluorinated acrylate oligomer, and mixtures thereof; said optional vinyl monomer is present and is one of triethyleneglycol divinyl ether, vinyl caprolactam, n-vinyl formamide, and mixtures thereof, each present in an amount of from about 10 to about 80 weight percent of the total carbon nanotube layer components.

18. An intermediate transfer member in accordance with claim 12 wherein said acrylate monomer is present, and is at least one of trimethylolpropane triacrylate, butandiol diacrylate, hexandiol diacrylate, tripropyleneglycol diacrylate, or dipropyleneglycol diacrylate, each present in an amount of from about 30 to about 60 weight percent of the total carbon nanotube layer components.

19. An intermediate transfer member in accordance with claim 2 with a surface resistivity of from about $10^8$ to about $10^{13}$ ohm/sq.

20. An intermediate transfer member in accordance with claim 2 further comprising an outer release layer positioned on said carbon nanotube layer.

21. An intermediate transfer member in accordance with claim 20 wherein said release layer comprises a fluorinated ethylene propylene copolymer, a polytetrafluoroethylene, a polyfluoroalkoxy polytetrafluoroethylene, a fluorosilicone, a polymer of vinylidenefluoride, hexafluoropropylene, and tetrafluoroethylene, or mixtures thereof.

22. An intermediate transfer member in accordance with claim 2 further including in said substrate a conductive component present in an amount of from about 1 to about 40 percent by weight of the total substrate.

23. An intermediate transfer member in accordance with claim 22 wherein said conductive component is a carbon black, a polyaniline, or a metal oxide, each present in an amount of from about 2 to about 25 percent by weight of the total substrate components.

24. An intermediate transfer member in accordance with claim 2 further including an adhesive layer situated between the supporting substrate and the carbon nanotube layer.

25. An intermediate transfer member in accordance with claim 24 wherein said adhesive layer is of a thickness of from about 1 to about 100 nanometers, and said layer is comprised of an epoxy, a urethane, a silicone, or a polyester.

26. An intermediate transfer member in accordance with claim 2 wherein said substrate is of a thickness of from about 20 to about 500 microns, and said carbon nanotube layer is of a thickness of from about 1 to about 150 microns.

27. An intermediate transfer member comprised of a polyimide supporting substrate layer, and thereover a layer comprised of a carbon nanotube, said carbon nanotube being comprised of a fullerene, and wherein there is added to said carbon nanotube a dispersant, and wherein said carbon nanotube layer includes an epoxy acrylate polymer, an acrylate monomer, and a photoinitiator as represented by

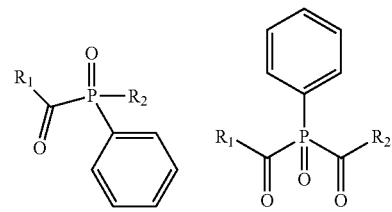

wherein $R_1$ and $R_2$ are alkyl, aryl, or mixtures thereof, and wherein said dispersant is represented by wherein n represents the number of repeating segments

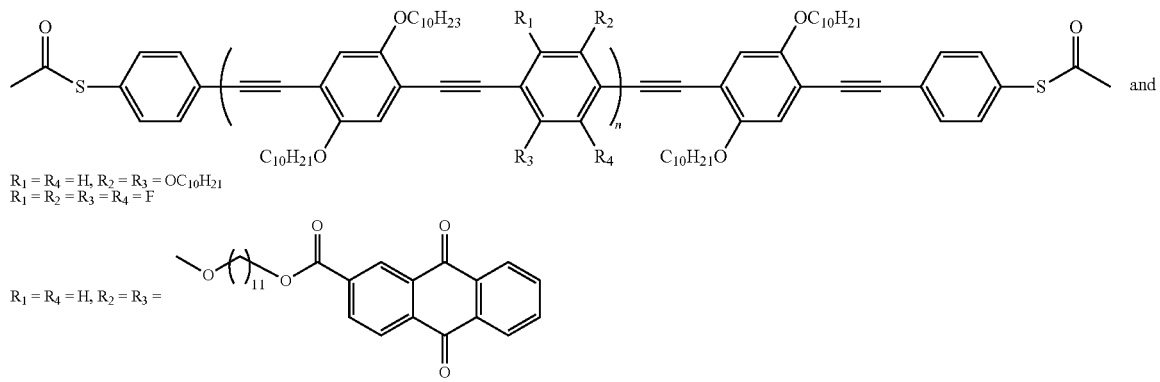

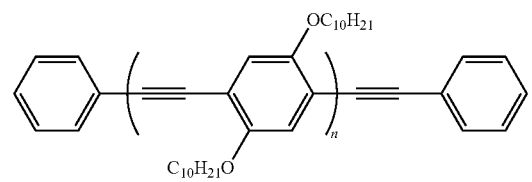

wherein n represents the number of repeating segments, and F is a halide.

28. An intermediate transfer member in accordance with claim 27 wherein said carbon nanotube is present in an amount of from about 0.5 to about 2 weight percent, said dispersant is present in an amount of from about 0.1 to about 0.4 weight percent, said epoxy acrylate polymer is present in an amount of from about 20 to about 40 weight percent, said acrylate monomer is present in an amount of from about 40 to about 70 weight percent, and said photoinitiator is present in an amount of from about 1 to about 5 weight percent of the nanotube layer components, and the total thereof is 100 percent.

29. An intermediate transfer member in accordance with claim 27 wherein $R_1$ and $R_2$ are alkyl containing from 1 to about 12 carbon atoms and said halide is fluoride.

30. An intermediate transfer member in accordance with claim 27 wherein $R_1$ and $R_2$ are aryl containing from 6 to about 18 carbon atoms and said halide is fluoride.

31. An intermediate transfer member in accordance with claim 27 wherein $R_1$ and $R_2$ are alkyl containing from 1 to about 12 carbon atoms.

32. An intermediate transfer member in accordance with claim 27 wherein $R_1$ and $R_2$ are alkyl containing from 1 to about 12 carbon atoms and said halide is chloride, bromide, or iodide.

* * * * *